(12) United States Patent
Kawai et al.

(10) Patent No.: US 7,879,439 B2
(45) Date of Patent: Feb. 1, 2011

(54) POLYPROPYLENE LAMINATE FILM, AND PACKAGE COMPRISING THE SAME

(75) Inventors: Kenji Kawai, Aichi (JP); Hirokazu Oogi, Aichi (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 593 days.

(21) Appl. No.: 10/593,237

(22) PCT Filed: Feb. 18, 2005

(86) PCT No.: PCT/JP2005/002545
§ 371 (c)(1),
(2), (4) Date: Jul. 17, 2007

(87) PCT Pub. No.: WO2005/090073
PCT Pub. Date: Sep. 29, 2005

(65) Prior Publication Data
US 2008/0003386 A1    Jan. 3, 2008

(30) Foreign Application Priority Data

Mar. 18, 2004 (JP) .............................. 2004-077340
Mar. 18, 2004 (JP) .............................. 2004-077342

(51) Int. Cl.
*B32B 27/00* (2006.01)
(52) U.S. Cl. ...................................... 428/220; 428/35.2
(58) Field of Classification Search ................. 428/35.2, 428/220; 264/120.7
See application file for complete search history.

(56) References Cited

U.S. PATENT DOCUMENTS

| 3,202,528 | A | 8/1965 | James |
| 4,384,024 | A | 5/1983 | Mitchell et al. |
| 4,726,999 | A | 2/1988 | Kohyama et al. |
| 4,822,840 | A | 4/1989 | Kioka et al. |
| 5,049,436 | A | 9/1991 | Morgan et al. |
| 5,376,437 | A | 12/1994 | Kawakami et al. |
| 5,888,648 | A | 3/1999 | Donovan et al. |
| 6,001,293 | A | 12/1999 | Wakamatsu et al. |
| 6,326,068 | B1 | 12/2001 | Kong et al. |
| 6,326,080 | B1 | 12/2001 | Okayama et al. |
| 6,458,470 | B1 | 10/2002 | DeLisio et al. |
| 2002/0164470 | A1 | 11/2002 | Bader |
| 2007/0292640 | A1 | 12/2007 | Kawai et al. |
| 2009/0068487 | A1 | 3/2009 | Kawai et al. |

FOREIGN PATENT DOCUMENTS

| EP | 0 554 450 | 8/1993 |
| JP | 05-229080 A | 9/1993 |
| JP | 07-117124 A | 5/1995 |
| JP | 09-207294 | 8/1997 |
| JP | 10-76618 | 3/1998 |
| JP | 11-348205 A | 12/1999 |
| JP | 2000-085073 | 3/2000 |
| JP | 2002-154188 | 5/2002 |
| JP | 2002-240210 A | 8/2002 |
| JP | 2003-225979 | 8/2003 |
| JP | 2003-291282 A | 10/2003 |
| JP | 2004-345135 | 12/2004 |
| JP | 2004-345136 | 12/2004 |
| JP | 2004-351749 | 12/2004 |
| JP | 2005-088522 | 4/2005 |
| WO | WO-01/34390 | 5/2001 |

OTHER PUBLICATIONS

Kenji et al, JP 2003-291282 machine translation, Oct. 14, 2003.*
European Search Report mailed Mar. 11, 2009, directed towards related foreign application No. EP 06732094.5; 3 pages.
Michael Mullan and Derek McDowell (2003). "Modified Atmosphere Packaging" Chapter 10 in *Food Packaging Technology*, Ed. Coles et al., CRC Press, pp. 303-339.
International Search Report mailed Jul. 25, 2006, directed to International Application No. PCT/JP2006/308187; 2 pages.
Kawai et al., U.S. Office Action mailed Jan. 12, 2010, directed to U.S. Appl. No. 10/594,057; 13 pages.
Kawai et al., U.S. Office Action mailed May 12, 2009, directed to U.S. Appl. No. 11/912,978; 8 pages.
Kawai et al., U.S. Office Action mailed Oct. 28, 2009, directed to U.S. Appl. No. 11/912,978; 10 pages.
Kawai, K. et al., U.S. Office Action mailed Jun. 2, 2010, directed to U.S. Appl. No. 11/912,978; 9 pages.
Kawai, K. et al., U.S. Office Action mailed Jun. 23, 2010, directed to U.S. Appl. No. 10/594,057; 12 pages.
Kawai et al., U.S. Office Action mailed Sep. 28, 2010, directed to U.S. Appl. No. 11/912,978; 9 pages.

* cited by examiner

*Primary Examiner*—David R Sample
*Assistant Examiner*—Lawrence D Ferguson
(74) *Attorney, Agent, or Firm*—Morrison & Foerster LLP

(57) ABSTRACT

A wide polyolefin film may be made by high-speed film forming, which has uniform properties over its whole width and is free of thickness irregularities, and provides a packaging film applicable to large-scale production which has good gloss and bag-making property, as well as a package made from the film. A polyolefin laminate film includes an oriented base layer that is mainly made up of a polypropylene resin and a sealing layer mainly made up of a polyolefin resin which is formed on at least one surface of the base layer, which film has an effective product takeout width of not less than 5500 mm and satisfies the following relational formula of the thickness variation rate Y (%) of the film and the product takeout width X (mm) of the film:

$Y \leq 0.001X + 4$.

7 Claims, 2 Drawing Sheets

POLYPROPYLENE LAMINATE FILM, AND PACKAGE COMPRISING THE SAME

REFERENCE TO RELATED APPLICATION

This application is a national stage application under 35 USC 371 of International Application No. PCT/JP2005/002545, filed Feb. 18, 2005, which claims priority from Japanese patent application Nos. 2004-077340, filed Mar. 18, 2004, and 2004-077342, filed Mar. 18, 2004, the disclosures of which are incorporated herein by reference.

TECHNICAL FIELD

The present invention relates to films and packages, particularly to films and packages made of a multi-layer laminate having a sealing layer on an inner surface, which is stable and superior in processing applicability due to the absence of the development of printing misalignment, pitch inconsistency, insufficient sealing strength and defective sealing appearance during printing steps and bag-making steps, which are important characteristics of packaging films for fresh food, processed food, pharmaceutical products, medical instrument, electronic parts and the like.

BACKGROUND ART

Conventionally, polypropylene films have been widely used in the packaging fields including food packaging, fiber packaging and the like, since they are superior in optical property, mechanical property, packaging applicability and the like. Particularly, composite films having a sealing layer have been widely used as materials for pillow type packages and side-weld sealing bags.

In addition, these films have been produced in large scales in recent years due to high-speed film forming and wide width film forming. What forms a problem in such large-scale production is the thickness irregularity of the film. When a film has thickness irregularity, printability, bag-making property and the like are markedly degraded during film processing steps. With regard to reduction of thickness irregularity, it is comparatively easy for polyester films since they can be easily contacted closely to a roll by electrostatic adhesion method and the like, but the reduction in polyolefin films requires a special production method to achieve smoothness and flatness as shown in patent reference 1, since a melt-extruded film cannot be easily contacted closely to a roll by electrostatic adhesion method, and thickness irregularity tends to develop due to high molten viscosity and wide molecular weight distribution of polyolefin resins, and the relaxation time distribution of molten deformation caused by molecular weight distribution of polyolefin resin and the like patent reference 1: JP-A-7-117124

SUMMARY OF THE INVENTION

An object of the present invention is to obtain a film free of thickness irregularity over the whole width and with small dispersion in the property even in high-speed forming of polyolefin films and rolling up of wide films, and to provide a film applicable to large-scale production, free of thickness irregularity and superior in flatness, gloss and bag-making property, as well as a package having stable property and appearance.

Accordingly, the present invention has the following constitution.

1. A polyolefin laminate film comprising an oriented base layer mainly comprising a polypropylene resin and a sealing layer mainly comprising a polyolefin resin which is formed on at least one surface of the base layer, which film has a product takeout width of not less than 500 mm and satisfies the following relational formula of a width direction thickness variation rate Y (%) of the aforementioned film and a product takeout width X (mm) of the film:

$Y \leq 0.001X + 4$

2. The polyolefin laminate film of 1, which is biaxially oriented.
3. The polyolefin laminate film of 1 or 2, wherein the base layer comprises an antifog agent.
4. A package comprising the polyolefin laminate film of 3, which comprises a sealing layer comprising an antifog agent migrated from the base layer.
5. A production method of a polyolefin laminate film, which comprises melting by heating a base layer-forming resin mainly comprising crystalline polypropylene and a sealing layer-forming resin mainly comprising polyolefin having a swelling ratio smaller than that of the base layer-forming resin in separate extruders, laminating the sealing layer-forming resin on the base layer-forming resin in a T-die, melt extruding the laminate from an outlet slit of the T-die to give a film, and cooling the film to solidify into an unoriented film, wherein the unoriented film is brought into close contact with a chill roll by blowing a wind to the film-like resin at a wind pressure of 700-2200 mmH$_2$O with an air knife from the side opposite to the contact surface with the chill roll, while dropping said melt extruded film-like resin on the chill roll, and the unoriented film is heated to a temperature of 90-140° C., drawn 3- to 7-fold in the longitudinal direction, cooled, led to a tenter type stretching machine, heated to a temperature of 100-175° C., drawn 8- to 12-fold in the width direction, heat treated at a temperature of 80-168° C. for a relaxation treatment in the width direction by 2-15%, cooled and wound.
6. A roll of the polyolefin laminate film of 1, wherein the film has a width of not less than 500 mm and a length of not less than 2000 m.
7. The polyolefin laminate film roll of 6, wherein the polyolefin film shows a thickness variation Z (%) of not less than 3% and not more than 15%, when a test piece (20000 mm in the machine direction and 40 mm in the width direction) is cut out from the film in the stable region in the length direction of the film where the film property is stable and the thickness is continuously measured for 20000 mm in the machine direction.
8. A roll of the polyolefin laminate film of 1, wherein the film has a width of not less than 5500 mm and a length of not less than 2000 m.
9. The polyolefin laminate film roll of 8, wherein the polyolefin film shows a thickness variation Z (%) of not less than 3% and not more than 15%, when a test piece (20000 mm in the machine direction and 40 mm in the width direction) is cut out from the film in the stable region in the length direction of the film where the film property is stable and the thickness is continuously measured for 20000 mm in the machine direction.

Although the polypropylene laminate film of the present invention is a wide-width polypropylene laminate film obtained by high-speed film forming, it shows stable processing applicability as evidenced in very small thickness irregularity, superior flatness and gloss, small dispersion in the property, free of insufficient sealing strength and development of defective seal appearance, good bag-making property and the like, and is preferable as a packaging film and a package with particularly emphasis on the appearance.

DETAILED DESCRIPTION OF THE INVENTION

Figure 1:
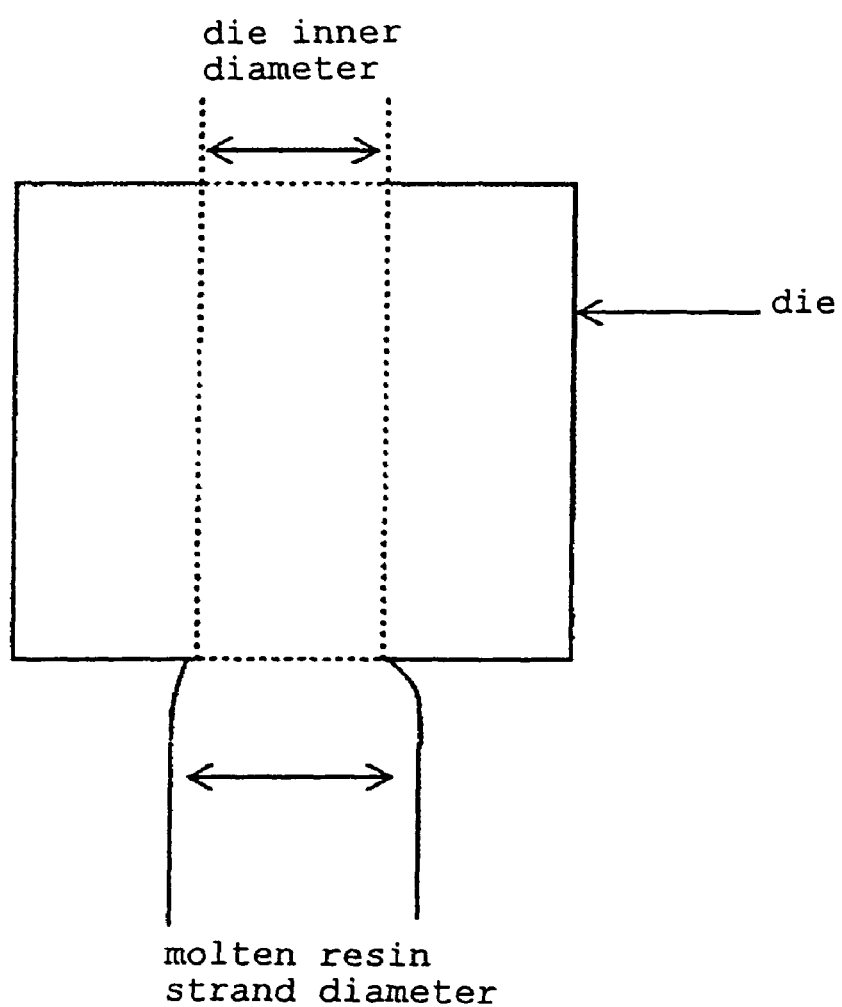
FIG. 1 is a conceptual diagram of swelling ratio.

The present invention is explained in detail in the following.

The polypropylene laminate film of the present invention is made of a laminate comprising a base layer mainly comprising a polypropylene resin and a sealing layer mainly comprising a polyolefin resin, which is formed on one surface of the base layer.

Such polypropylene laminate film is preferably produced by a coextrusion method and the like to deal with large-scale production. While the base layer of the packaging film constituting the present invention is preferably biaxially oriented, the sealing layer to be formed on the inside surface of the package may be unoriented, uniaxially oriented or biaxially oriented.

As polypropylene resins suitable for forming a base layer of the polypropylene laminate film of the present invention, for example, isotactic polypropylene obtained by a gas phase method, or one or more kinds of propylene•ethylene copolymer, propylene•butene-1 copolymer, propylene•ethylene•butene-1 copolymer, propylene•pentene copolymer and the like are preferably used.

In addition, other polyolefin resins, for example, ethylene•butene-1 copolymer, ethylene•propylene•butene-1 copolymer, ionomers obtained by crosslinking ethylene•acrylic acid copolymer•ethylene•acrylic acid copolymer with a metal ion, polybutene-1, butene•ethylene copolymer and the like may be used as a part thereof, and polyester resin, polyamide resin, polycarbonate resin and the like can also be used to the extent that the characteristics of the film are not impaired. Furthermore, UV absorber, antioxidant and the like may be freely added.

For reduction of the thickness irregularity of the film, however, a polyolefin resin forming the base layer preferably has a swelling ratio greater than the swelling ratio of the polyolefin resin of the sealing layer formed on at least one surface of the film surface and not more than 1.42.

As used herein, the swelling ratio means a measure of the size of a die swell (showing the flow state of molten resin at an extrusion die outlet), where a greater value means a greater swelling at the extrusion die outlet and a greater resistance. When it is small, the swelling at the extrusion die outlet is small and the resistance is small.

When the swelling ratio of the polypropylene resin forming the base layer is not more than the swelling ratio of the polyolefin resin of the sealing layer formed on one surface (on the side in close contact with chill roll), it may happen that, when a resin is melted in an extruder, extruded from a die to be dropped on a take-up machine (chill roll) and blown with air from the outside with an air knife and the like to achieve close contact therewith, the contact with the take-up machine becomes unstable, the flatness of the film surface is impaired and the thickness irregularity is developed. When the swelling ratio exceeds 1.42, too much pressure heads toward outside at the die outlet, causing a friction between a sealing layer resin surface and metal at the die outlet. As a result, the film surface becomes rough and the thickness irregularity may be developed.

When sealing layers are formed on both surfaces, one of the sealing layers, and when a sealing layer is formed only on one surface, said sealing layer, needs to be dropped on the take-up machine (chill roll). In the present application, it is particularly preferable that the sealing layers be formed on both surfaces, since a greater effect of prevention of a rough surface of the film can be afforded, but the sealing layers are not limited to be present on both surfaces.

As polypropylene resin suitable for forming a sealing layer, for example, one or more kinds from ethylene•butene-1 copolymer obtained by a gas phase method, ethylene•propylene•butene-1 copolymer, ethylene•acrylic acid copolymer, ionomer obtained by crosslinking ethylene•acrylic acid copolymer with a metal ion, polypropylene, polybutene-1, butene•ethylene copolymer, propylene•propylene•butene-1 copolymer, propylene•pentene copolymer and the like are preferably used.

Furthermore, polyester resin, polyamide resin, polycarbonate resin and the like may be used to the extent that the characteristics of the film are not impaired. In addition, it is preferable to contain inorganic particles or fine particles of an organic polymer as appropriate.

However, the polyolefin resin suitable for forming a sealing layer of the packaging film surface in the present invention preferably has a swelling ratio within the range of 1.10-1.40. When the swelling ratio is less than 1.10 and a resin is extruded from a die outlet, the contact with the take-up machine becomes unstable, the flatness of the film surface is impaired and the thickness irregularity is developed. When the swelling ratio exceeds 1.40, too much pressure heads toward outside at the die outlet, causing a friction between a sealing layer resin surface and metal at the die outlet. As a result, the film surface becomes rough and the thickness irregularity is developed. In other words, when the swelling ratio of the base layer and the sealing layer is set to fall within a particular range, extrusion from a die, cooling and taking-up of the resin can be stably performed, which is advantageous to the production of a wide and elongate film, since the thickness variation in the width direction of the finally obtained film can be made small and its variation is stable.

The production method of the film of the present invention is now explained.

The method preferably comprises separately supplying a base layer-forming resin mainly comprising crystalline polypropylene and a sealing layer-forming resin mainly comprising polyolefin to different extruders, melting the resins by heating, passing them through filtration filters, laminating the base layer-forming resin on the sealing layer-forming resin in a T-die at a temperature of 220-320° C., melt extruding the laminate from a slit-like T-die outlet, and solidifying the laminate by cooling, whereby an unoriented film is produced. At this time, it is preferable that the resin be dropped on a drum-like take-up machine (chill roll), and the air is blown by an air knife from the side opposite to the contact face with the chill roll, since the adhesion between the non-oriented sheet and the chill roll increases and a good non-oriented sheet can be obtained.

The air pressure of the air knife here is within the range of 700-2200 mmH$_2$O. When the air pressure is low, the adhesion between the non-oriented sheet and the chill roll becomes non-uniform, and when the air pressure is high, the non-oriented sheet flaps and the adhesion to the chill roll becomes unpreferably non-uniform.

The distance between the air knife and the non-oriented sheet is preferably within the range of 1 mm-5 mm. When the air distance is short, the non-oriented sheet tends to flap and may contact with the tip of the air knife, and when the distance is long, the close contact between the non-oriented sheet and the chill roll may become insufficient. The distance between the air knife and the non-oriented sheet here means the perpendicular distance from the tip of the air knife to the non-oriented sheet.

It is important that the air from the air knife hit the contact point of the non-oriented sheet and the chill roll. For this end, the angle of the air knife with the non-oriented sheet may be adjusted. When the angle is small, the contact point of the chill roll varies since the air hits prior to the contact of the molten resin with the chill roll, and when the angle is large, the close contact becomes insufficient since the air hits the side in the progress direction from the contact point of the molten resin with the chill roll, causing thickness variation. The angle here of the air knife with the non-oriented sheet means an angle of the air blown to the line drawn from the center of the chill roll to the grounding point of the molten resin. The resin temperature is preferably within the range free of development of degradation of the resin and a high temperature of about 230-290° C., more preferably a high temperature of about 270-280° C.

The resin temperature of the base layer-forming resin mainly comprising crystalline polypropylene and the sealing layer-forming resin mainly comprising polyolefin when each resin has a melting point is preferably not less than 60° C. higher than the melting point, more preferably not less than 70° C. higher than the melting point, which does not cause thermal degradation. At such a high temperature, thick macula can be reduced since the influence of the relaxation time distribution of molten deformation dependent on the molecular weight distribution of the polyolefin resin can be decreased.

The chill roll temperature is preferably a low temperature of not more than about 30° C., more preferably a low temperature of not more than about 20° C. When the resin temperature is low and the chill roll temperature is high, crystallization of resin proceeds, the film surface becomes rough and the thickness irregularity tends to develop unpreferably. The unoriented film is biaxially stretched for biaxial orientation. As a stretching method, a sequential biaxial orientation method or a simultaneous biaxial orientation method can be used. According to the sequential biaxial orientation method, an unoriented film is heated to a temperature of 90-140° C., stretched 3- to 7-fold in the longitudinal direction, cooled, led to a tenter type stretching machine, heated to a temperature of 100-175° C., stretched 8- to 12-fold in the width direction, heat-treated at a temperature of 80-168° C., relaxed in the width direction by 2-15%, preferably 4-10%, cooled and wound up. When a relax heat treatment is applied after stretching, the distortion of molten deformation, which is dependent on the molecular weight distribution of a polyolefin resin, is dissolved, and the property of the laminate film such as heat shrink performance and the like is stabilized over the whole width of the film. As a result, heat sealability is stabilized and a package having stable property and appearance can be obtained.

The laminate film of the present invention needs to satisfy the following relational formula of the thickness variation rate Y (%) of the film and the product takeout width X (mm) of the film.

$$Y \leq 0.001X+4$$

Preferably, the laminate film satisfies the relationship of $Y \leq 0.001X+3.8$, particularly preferably $Y \leq 0.001X+3.5$. When the film fails to satisfy the above-mentioned relational formula, it unpreferably shows poor flatness, loses gloss as a result of reflection of light, meanders during bag-making to develop bag-making failure and the like. When the variation rate Y is 1%, the film is sufficiently superior in practice. As used herein, Y shows width direction thickness variation rate of the part corresponding to the product takeout width X.

The thickness variation rate Y here is measured as follows.

Thickness variation rate (%): Using a continuous film thickness meter manufactured by Anritsu Company (product name: K-313A wide area high sensitivity electron micrometer and a film transporter manufactured by Micron Instrument Co., Ltd. as a film transporting apparatus: product No. A90172), the film thickness was continuously measured over the whole product takeout width perpendicular to the film roll up direction and the thickness variation rate was calculated from the following formula.

$$\text{Thickness variation rate (\%)}=[(\text{maximum thickness}-\text{minimum thickness})/\text{average thickness}]\times 100$$

For the object large-scale production, moreover, the film product takeout width of the laminate film of the present invention is at least 500 mm. Even in the case of a wide film of not less than 5500 mm, it is preferable that the film thickness variation rate satisfy the above-mentioned formula over the whole product takeout width perpendicular to the film roll up direction. When the product takeout width is less than 500 mm, the production amount may not be worth a large-scale production.

As used herein, the product takeout width means a product takeout width excluding highly thick portions such as unoriented parts developed on both ends in the film width direction, a film in transverse drawing and the like during a film forming step or the width of a film divided by forming slits therein.

It is of course preferable that, in the case of a product takeout width excluding highly thick portions such as unoriented parts developed on both ends in the film width direction, the relationship between the film thickness variation rate Y (%) and the product takeout width X (mm) of the film satisfy the above-mentioned formula. The product takeout width in this case is preferably not less than 5500 mm.

The laminate film of the present invention preferably has a width direction thickness variation rate Y of not more than 10%, more preferably not more than 9%, particularly preferably not more than 8%, most preferably not more than 7%. When the thickness variation rate Y in the width direction exceeds 10%, the film meanders during printing and bag-making, thus unpreferably developing printing pitch inconsistency, bag-making failure and the like. In addition, when the film is slit from a wide winding up roll to a small width product before use, new condition setting for printing and bag-making processing unpreferably becomes necessary since each product shows a thickness variation. When the variation rate Y is 1%, the film is sufficiently superior in practice.

The polyolefin laminate film of the present invention is preferably a film roll winding not less than 2000 m of a polyolefin laminate film having a product takeout width of not less than 500 mm around a roll up core. The effect of the invention is not easily expressed in the case of a film roll where the film length is less than 2000 m, since the thickness variation over the full length of the film becomes small due to the short length of the film wound. The length of the polyolefin laminate film to be wound around a roll is more preferably not less than 4000 m, and still more preferably not less than 8000 m. The same applies to a film having a product takeout width of not less than 5500 mm.

As a winding core, a metal core of 313 mmφ and the like can be generally used.

When a test piece (machine direction 20000 mm, width direction 40 mm) is cut out from the stable region, where the film properties are stable in the length direction of the film, of the polyolefin laminate film constituting the polyolefin laminate film roll of the present invention and the film thickness is measured over 20000 mm in the machine direction, the test piece obtained from the stable region shows a thickness variation rate Z in the elongation direction of not less than 3%, preferably not more than 15%, more preferably not more than 10%.

The thickness variation rate Z here is measured as follows.

Using a continuous film thickness meter (product name: K-313A wide area high sensitivity electronic micrometer, manufactured by Anritsu Company) and a film delivery apparatus manufactured by Micron Instrument Co., Ltd.: product No. A90172) as a film delivery apparatus, film thickness was continuously measured for 20000 mm and the thickness variation rate was calculated from the following formula.

Thickness variation rate (%)=[(maximum thickness−minimum thickness)/average thickness]×100

First, the meaning of the "stable region where the film properties are stable in the length direction of the film" that defines the above-mentioned sample cut out part is explained. The "stable region where the film properties are stable in the length direction of the film" is a region where film forming step and drawing step are performed stably during film production to afford mostly uniform film property.

The technical idea of the present invention is to afford a highly uniform heat shrink rate in the direction perpendicular to the maximum shrinkage direction of an elongate film obtained during stable operation of the film forming step and the drawing step. In practical operation, the film property may vary depending on the starting material supply method and film forming conditions during the film production. In the present invention, the uniformity is not requested of a film obtained when the film forming step and the drawing step are unstable. Thus, sampling for the evaluation of characteristic requiring uniformity is assumed to be performed only in the region where the film forming step and the drawing step are stably performed, i.e., "stable region".

Accordingly, for example, when about 10 m of a film from the beginning of winding corresponds to non-stable operation, such part is excluded from the sampling area, and said 10 m from the beginning of winding is sampled as a first end portion of the aforementioned film.

The number of the aforementioned stable region (stable operation region) is generally one in one film roll (one in the entire film roll). Depending on the progress of production, multiple stable regions may be present, in which case samples are taken from the stable region alone.

The sampling method is now explained. A test piece (machine direction 20000 mm, width direction 40 mm) is freely cut out from the above-mentioned stable region of a film wound around one roll.

When fresh food is packaged with the laminate film of the present invention, an antifog agent is preferably contained in the sealing layer on the side to be in contact with the fresh food, so that the antifog property can be demonstrated during preservation or distribution of the packaged fresh food. For the reduction of film thickness irregularity, such antifog agent is preferably contained in a base layer resin during extrusion of the base layer, thereby to cause transfer of the antifog agent to the surface of a sealing layer during preservation or distribution of the packaged fresh food. When it is contained in the base layer, the sealing property is not impaired by the antifog agent, and the heat sealing strength is preferably stabilized. When an antifog agent is absent, the inside of the package may be clouded and the product value may be degraded.

As the antifog agent here, for example, fatty acid esters of polyvalent alcohol, higher fatty acid amines, amides of higher fatty acid, ethylene oxide adduct of amine or amide of higher fatty acid and the like can be typically mentioned. The content of the antifog agent in the film is preferably 0.1-10% by mass, particularly 0.2-5% by mass, based on the whole layers, and preferably not more than 5% by mass, particularly 0.1-1.0% by mass, of the constituent components of the sealing layer.

While the thickness ratio of the sealing layer is not particularly limited, it is generally preferably 1/50-1/3 of the whole layers (when the base layer has a sealing layer on both sides, the total thickness thereof) of the laminate film of the present invention. When the thickness ratio is smaller, the sealing strength becomes insufficient on bag-making, thus impairing the reliability as a package. When the thickness ratio is greater, the proportion of the base layer becomes small, which in turn degrades the toughness of the laminate film as a whole. As a result, the shape of the package filled with the contents becomes unstable and lacks product value. While the thickness of the laminate film is not particularly limited, it is about 5-250 μm, within which range the thickness of the sealing layer can be appropriately determined. The laminate film of the present invention is particularly useful when it has a thickness of 15 μm-60 μm.

The measurement methods of the property values used in the present Description are shown in the following.

(1) Swelling Ratio

A measure of the size of die swell, where a greater value means greater swelling at the extrusion outlet. The molten resin discharge part during measurement of melt flow rate according to polypropylene test method (230° C., 21.18N) defined in JIS K6758 was photographed, and the ratio of the die inner diameter and the diameter of the molten resin strand extruded from the die was measured.

Swelling ratio=diameter of molten resin strand/die inner diameter

FIG. 1 shows a conceptual drawing of the measurement.

(2) Width Direction Thickness Variation Rate Y (%)

Using a continuous film thickness meter (product name: K-313A wide area high sensitivity electronic micrometer, manufactured by Anritsu Company) and a film delivery apparatus manufactured by Micron Instrument Co., Ltd.: product No. A90172) as a film delivery apparatus, film thickness was continuously measured over the whole product takeout width (film length in the roll up direction, 40 mm) perpendicular to the roll up direction of the film and the thickness variation rate was calculated from the following formula.

Thickness variation rate (%)=[(maximum thickness−minimum thickness)/average thickness]×100

(3) Gloss (%)

Gloss was measured according to ASTM D2457. A higher numerical value shows good gloss.

(4) Processing Applicability (Melt Cut Sealing)

Using a side-weld sealing machine (manufactured by Kyoei Printing Machine Material: PP500), a side-weld sealing bag was made from the film.

conditions: side-welding blade; blade angle 60° sealing temperature; 370° C.

shot number; 120 bags/min

The outcome of the finished side-weld sealing bags was ranked according to the following evaluation criteria.

⊙: very good (folding performance with triangle plate is good, end faces of the opening of the bag are accurately aligned, and the sealed parts are tidily finished)

○: good (generally fine, though slight adjustment of bag-making conditions is necessary)

x: somewhat bad (considerable adjustment of bag-making conditions is necessary)

xx: bad (adjustment is insufficient to solve problems, end faces of the opening of the bag are not aligned at many points, and the sealed parts are poorly finished)

(5) Heat Sealing Strength

A sample (product takeout width×length direction 500 mm) was taken and divided into 3 equal parts in the width direction. Samples (width direction 50 mm×length direction 250 mm) were taken from the center of respective parts, folded in two with the sealing surface facing inside, and subjected to hot plate sealing under the conditions of a heat sealing temperature 130° C., pressure 1 kg/cm², heat sealing time 1 second to give test pieces (15 mm width). The peeling strength of the test pieces at 180 degrees was measured and taken as the heat sealing strength (N/15 mm).

(6) Thermal Shrinkage (%)

Figure 2:
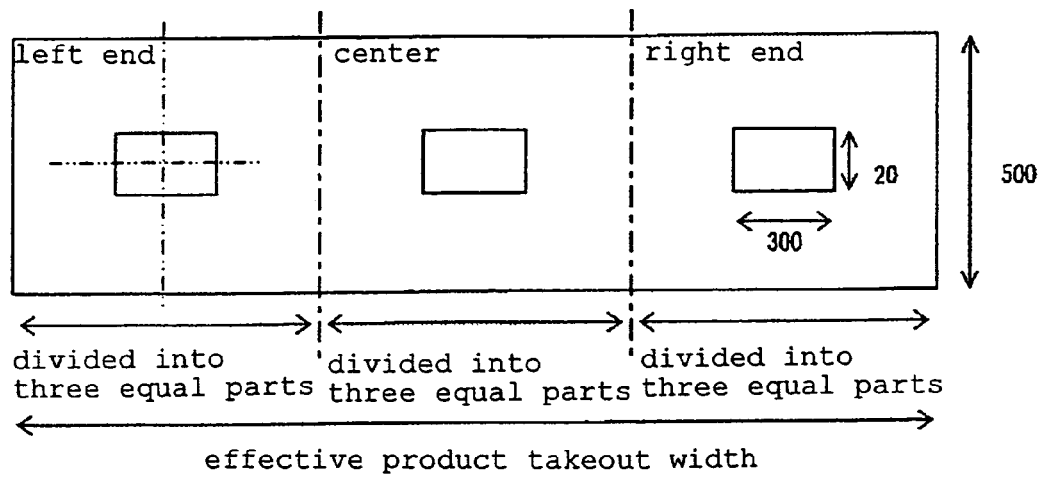
FIG. 2 is a conceptual diagram of thermal shrinkage measurement.
Figure 2:
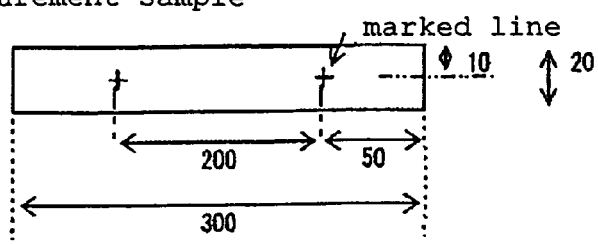

A sample (product takeout width×length direction 500 mm) was taken and divided into 3 equal parts in the width direction. Samples (width direction 300 mm×length direction 20 mm) were taken from the center of respective parts, gauge lines were marked at 200 mm intervals in the center thereof as shown in FIG. 2, and the distance A was measured. The samples were placed free of load in an oven at 120° C. for 5 min, and left standing at room temperature for 30 min. The distance B between the gauge lines was measured, and the thermal shrinkage was determined from the following formula.

Thermal shrinkage (%)=[$(A-B)/A$]×100

(7) Thickness Variation Rate Z (%)

Samples were cut out from the stable region in the film rolls obtained in Examples and Comparative Examples, and the thickness variation rate Z (the above-mentioned (7)) was measured. For the measurement, test pieces (machine direction 20000 mm, width direction 40 mm) were cut out from the stable region where the film properties are stable in the length direction of the film and film thickness was continuously measured for 20000 mm in the machine direction.

Using a continuous film thickness meter (product name: K-313A wide area high sensitivity electronic micrometer, manufactured by Anritsu Company) and a film delivery apparatus manufactured by Micron Instrument Co., Ltd.: product No. A90172) as a film delivery apparatus, film thickness was continuously measured for 20000 mm and the thickness variation rate was calculated from the following formula.

Thickness variation rate (%)=[(maximum thickness−minimum thickness)/average thickness]×100

EXAMPLES

The present invention is explained in detail in the following by referring to Examples, which are not to be construed as limitative.

Example 1

(i) Sealing Layer-Forming Resin (a) FSX66M3 (100 parts by mass, manufactured by Sumitomo Chemical Company, Limited, swelling ratio 1.24, melt flow rate 2.9 g/10 min, melting point 132.8° C.) made of a propylene•ethylene•butene copolymer (80 parts by mass, ethylene content 2.5 mol %, butene content 7 mol %, melting point 133.2° C.) and a propylene•butene copolymer (20 parts by mass, butene content 25 mol %, melting point 128.0° C.) was used as a sealing layer-forming resin.

(ii) Base Layer-Forming Resin (b) An isotactic polypropylene polymer FS2011DG3 (100 parts by mass, manufactured by Sumitomo Chemical Company, Limited, swelling ratio 1.31, melt flow rate 2.5 g/10 min, melting point 158.5° C.) was mixed with an antifog agent (higher fatty acid ester monoglycerite, 1.0 part by mass) to give a base layer-forming resin.

(iii) Film Forming

Resin (a) and resin (b) were melted at 1:9 (mass ratio) to a resin (a) temperature of 270° C. and a resin (b) temperature of 278° C., coextruded from a T die (lip width 900 mm, lip gap 2.5 mm) on both surfaces of the base layer to form a 3 layer laminate including a sealing layer and air was blown (wind pressure 1060 mmH$_2$O) toward the contact point between the unoriented sheet and the chill roll, on a drum-like take-up machine (chill roll, temperature 20° C.) at 200 mm downward from the T die outlet, using an air knife (lip gap 0.9 mm) set at a distance of 3.5 mm from the unoriented film and an angle of 14° with the unoriented film to solidify the laminate by cooling. The thus-obtained unoriented film was preheated to a temperature of 120° C., longitudinally stretched 3.8-fold at a temperature of 130° C. between rolls having different circumferential velocity, and cooled to 120° C. The stretched film was led to a tenter, preheated in an oven at 172° C. and transversely stretched 10-fold in an oven at 155° C. The film was further relaxed by 8% in the transverse direction in an oven at 165° C. to give an oriented film. During the production of the film, the production drawing steps were stabilized. Therefore, the film roll was confirmed to correspond to the stable region over the full-length of the film.

The obtained film was a 3 layer film consisting of a base layer 23 μm and sealing layers (one side 1 μm), totaling 25 μm. A film roll (effective product takeout width 6000 mm, length 24000 m) was divided in 10 equal parts in the width direction and 6 equal parts in the length direction to give a roll product (width 600 mm, length 4000 m).

Various characteristics of the obtained laminate film are shown in Table 1. From the Table, it is appreciated that the laminate film of the present invention shows a small thickness variation rate, and has superior gloss and processing applicability.

Example 2

In the same manner as in Example 1 except that the resin temperature of (a), (b) was set to 260° C. and the temperature of the chill roll was set to 25° C., the laminate film of Example 2 was obtained. Various characteristics of the obtained laminate films are shown in Table 1.

As compared to Example 1, the laminate films of Example 2 showed a rather high thickness variation rate, but gloss and processability were fine.

Comparative Example 1

In the same manner as in Example 1 except that the swelling ratio of the resins to be used for the sealing layer and the base layer were changed as shown in Table 1, the film of Comparative Example 1 was obtained. Various characteristics of the obtained laminate film are shown in Table 1.

The film of Comparative Example 1 showed a high thickness variation rate, no gloss, and poor bag-making processability.

Comparative Example 2

In the same manner as in Example 1 except that the wind pressure of the air knife was set to 2500 mmH$_2$O, the laminate film of Comparative Example 2 was obtained. Various characteristics of the obtained laminate film are shown in Table 1.

The film of Comparative Example 2 showed a high thickness variation rate, no touch of gloss, and poor bag-making processability.

laminate film (base layer 23 μm, one surface of sealing layer 1 μm, totaling 25 μm) showing a wet tension of 39 mN/m of the corona discharge treated surface and an effective product takeout width of 6200 mm.

Various characteristics of the obtained laminate film are shown in Table 2. From the Table, it is appreciated that the laminate film of the present invention shows a small thickness variation rate, and has superior heat sealing strength and processing applicability.

TABLE 1

|  | swelling ratio | | product | thickness | | | thickness |
| --- | --- | --- | --- | --- | --- | --- | --- |
|  | base layer | sealing layer | takeout width X (mm) | variation rate Y (%) | gloss (%) | processing applicability | variation rate Z (%) |
| Example 1 | 1.31 | 1.24 | 600 | 3.5 | 130 | ◎ | 6.0 |
| Example 2 | 1.31 | 1.24 | 600 | 4.5 | 127 | ○ | 6.4 |
| Comparative Example 1 | 1.31 | 1.47 | 600 | 9.6 | 120 | X | 24.7 |
| Comparative Example 2 | 1.31 | 1.24 | 600 | 13.8 | 115 | X | 26.3 |

Example 3

(i) Sealing Layer-forming Resin
(a) FSX66M3 (100 parts by mass, manufactured by Sumitomo Chemical Company, Limited, swelling ratio 1.24, melt flow rate 2.9 g/10 min, melting point 132.8° C.) made of a propylene•ethylene•butene copolymer (80 parts by mass, ethylene content 2.5 mol %, butene content 7 mol %, melting point 133.2° C.) and a propylene•butene copolymer (20 parts by mass, butene content 25 mol %, melting point 128.0° C.) was used as a sealing layer-forming resin.

(ii) Base Layer-forming Resin
(b) An isotactic polypropylene polymer FS2011DG3 (100 parts by mass, manufactured by Sumitomo Chemical Company, Limited, swelling ratio 1.31, melt flow rate 2.5 g/10 min, melting point 158.5° C.) was mixed with an antifog agent (higher fatty acid ester monoglycerite, 1.0 part by mass) to give a base layer-forming resin.

(iii) Film Forming
Resin (a) and resin (b) were melted at 1:9 (mass ratio) to a resin (a) temperature of 270° C. and a resin (b) temperature of 278° C., coextruded from a T die (lip width 900 mm, lip gap 2.5 mm) on both surfaces of the base layer to form a 3 layer laminate including a sealing layer and air was blown (wind pressure 1060 mmH$_2$O) toward a drum-like take-up machine (chill roll, temperature 20° C.) at 200 mm from the T die outlet, using an air knife (lip gap 0.9 mm) to solidify the laminate by cooling. The thus-obtained unoriented film was preheated to a temperature of 120° C., longitudinally stretched 3.8-fold at a temperature of 130° C. between rolls having different circumferential velocity, and cooled to 120° C. The stretched film was led to a tenter, preheated in an oven at 172° C. and transversely stretched 10-fold in an oven at 155° C. The film was further relaxed by 8% in the transverse direction in an oven at 165° C. to give an oriented film.

Then, the sealing layer surface of the obtained film was subjected to a corona discharge treatment to give a three-layer

Example 4

In the same manner as in Example 3 except that the resin temperature of (a), (b) was set to 260°C. and the chill roll temperature was set to 25°C., a laminate film of Example 4 was obtained. Various characteristics of the obtained laminate films are shown in Table 2.

While the laminate film of Example 4 showed a greater thickness variation rate as compared to Example 3, the difference in the property between the left and right in the width direction of the product effective takeout width was small and processability was good.

Comparative Example 3

A film of Comparative Example 3 was obtained by changing the swelling ratio and melt flow rate of the resins used for the sealing layer and base layer in Example 3 to those shown in Table 2. Various characteristics of the obtained laminate film are shown in Table 2.

Comparative Example 3 showed a high thickness variation rate, the property between the left and right in the width direction of the product effective takeout width was different and the processability was poor.

Comparative Example 4

In the same manner as in Example 3 except that the wind pressure of the air knife was set to 2500 mmH$_2$O, a laminate film of Comparative Example 4 was obtained. Various characteristics of the obtained laminate film are shown in Table 2.

The laminate film of Comparative Example 4 showed a high thickness variation rate, the property between the left and right in the width direction of the product effective takeout width was different and the processability was poor.

TABLE 2

| | swelling ratio | | product | thickness | thermal shrinkage (%) | | | heat sealing strength (N/15 mm) | | | | | thickness |
| --- | --- | --- | --- | --- | --- | --- | --- | --- | --- | --- | --- | --- | --- |
| | base layer | sealing layer | takeout width X (mm) | variation rate Y (%) | right end | center | left end | right end | center | left end | gloss (%) | processing applicability | variation rate Z (%) |
| Ex. 1 | 1.31 | 1.24 | 6200 | 6.2 | 0.3 | 0.1 | 0.4 | 3.2 | 3.8 | 3.1 | 130 | ⊚ | 6.0 |
| Ex. 2 | 1.31 | 1.24 | 6200 | 7.3 | 0.5 | 0.4 | 0.1 | 2.9 | 3.3 | 3.8 | 127 | ○ | 6.4 |
| Comp. Ex. 1 | 1.31 | 1.47 | 6200 | 15.5 | −0.1 | 0.1 | 0.4 | 3.2 | 2.2 | 1.2 | 120 | X | 24.7 |
| Comp. Ex. 2 | 1.31 | 1.24 | 6200 | 20.0 | 1.0 | 0.7 | 0.5 | 2.5 | 4.1 | 3.6 | 115 | X | 26.3 |

While the polyolefin laminate film of the present invention is a polyolefin laminate film of not less than 500 mm, it is free of thickness irregularity over the entire width, has a touch of gloss and uniform property, and can be subjected to large-scale production. Since the film is uniform over the entire width and free of thickness irregularity, it is superior in the printability and bag-making property and shows stable and good heat sealability. Therefore, a package having a touch of gloss and superior in appearance can be obtained. The film can be widely used for packaging of fresh food, processed food and the like, and further, in various packaging fields of fiber, pharmaceutical product, medical instrument, electronic parts and the like.

The invention claimed is:

1. A film roll of a polyolefin laminate film wound into a roll, the polyolefin laminate film comprising an oriented base layer mainly comprising a polypropylene resin and a sealing layer mainly comprising a polyolefin resin which is formed on at least one surface of the base layer, which film has a product takeout width of not less than 500 mm and satisfies the following relational formula of a width direction thickness variation rate Y (%) of the aforementioned film and a product takeout width X (mm) of the film:

$Y \leq 0.001X + 4$, wherein the polyolefin laminate film of the roll has a product takeout width of not less than 500 mm and a length of not less than 2000 m.

2. The film roll of claim 1, wherein the polyolefin film of the roll shows a thickness variation Z (%) of not less than 3% and not more than 15%, when a test piece (20000 mm in the machine direction and 40 mm in the width direction) is cut out from the film in the stable region in the length direction of the film where the film property is stable and the thickness is continuously measured for 20000 mm in the machine direction.

3. The film roll of claim 1, wherein the polyolefin laminate film is biaxially oriented.

4. A roll of a polyolefin laminate film wound into a roll, the polyolefin laminate film comprising an oriented base layer mainly comprising a polypropylene resin and a sealing layer mainly comprising a polyolefin resin which is formed on at least one surface of the base layer, which film has a product takeout width of not less than 500 mm and satisfies the following relational formula of a width direction thickness variation rate Y (%) of the aforementioned film and a product takeout width X (mm) of the film:

$Y \leq 0.001X + 4$, wherein the film has a width of not less than 5500 mm and a length of not less than 2000 m.

5. The polyolefin laminate film roll of claim 4, wherein the polyolefin film of the roll shows a thickness variation Z (%) of not less than 3% and not more than 15%, when a test piece (20000 mm in the machine direction and 40 mm in the width direction) is cut out from the film in the stable region in the length direction of the film where the film property is stable and the thickness is continuously measured for 20000 mm in the machine direction.

6. A film roll of a polyolefin laminate film wound into a roll, the polyolefin laminate film comprising an oriented base layer mainly comprising a polypropylene resin and a sealing layer mainly comprising a polyolefin resin which is formed on at least one surface of the base layer, which film has a product takeout width of not less than 500 mm and satisfies the following relational formula of a width direction thickness variation rate Y (%) of the aforementioned film and a product takeout width X (mm) of the film:

$Y \leq 0.001X + 4$, wherein the base layer comprises an antifog agent, and the polyolefin laminate film of the roll has a product takeout width of not less than 500 mm and a length of not less than 2000 m.

7. The film roll of claim 6, wherein the polyolefin laminate film is biaxially oriented.

* * * * *